United States Patent

[11] 3,601,732

| [72] | Inventors | Ronald L. Samuels<br>Palos Verdes Peninsula;<br>Josef E. Friederichs, Pacific Palisades, both of, Calif. |
|---|---|---|
| [21] | Appl. No. | 861,819 |
| [22] | Filed | Sept. 29, 1969 |
| [45] | Patented | Aug. 24, 1971 |
| [73] | Assignee | TRW Inc.<br>Redondo Beach, Calif. |

[54] LINEAR VARIABLE ELECTRICAL TRANSDUCER
13 Claims, 3 Drawing Figs.

[52] U.S. Cl. .................................................. 336/30,
73/141 A, 336/136
[51] Int. Cl. .................................................. H01f 21/06
[50] Field of Search............................................ 336/30,
136, 130; 73/141 A, 71.4, 398 R

[56] References Cited
UNITED STATES PATENTS

| 2,570,672 | 10/1951 | Hathaway.................. | 336/30 |
| 2,677,272 | 5/1954 | Blancher.................... | 73/141 A X |
| 3,052,858 | 9/1962 | Darlington ................. | 336/30 |
| 3,142,794 | 7/1964 | Pegram ..................... | 336/30 X |
| 3,182,495 | 5/1965 | Johnson ..................... | 73/141 A |
| 3,213,395 | 10/1965 | Glerum ...................... | 336/30 |
| 3,218,590 | 11/1965 | Gerstine..................... | 336/30 |
| 3,221,281 | 11/1965 | Roeger....................... | 336/30 |

*Primary Examiner*—Thomas J. Kozma
*Attorneys*—Daniel T. Anderson, Donald R. Nyhagen and Jerry A. Dinardo ABSTRACT: A linear variable electrical transducer characterized by high accuracy and sensitivity, compact size, relatively long stroke, very low breakaway friction, and rugged damage and clog resistant construction. The transducer has a housing containing a flexure-supported coupling shaft and an electrical sensor laterally displaced from and operatively connected to the shaft for producing an electrical signal representing the position of the shaft relative to the housing. The flexure supports provide stiff radial positioning of the coupling shaft while requiring very low force for axial movement and no breakaway resistance of the shaft. The sensor is isolated from all external loads applied to the coupling shaft, thus permitting the use of a relatively fragile miniature sensor to substantially reduce the overall size and weight of the transducer. A novel flexure configuration for the transducer characterized by a high aspect ratio.

PATENTED AUG 24 1971 3,601,732
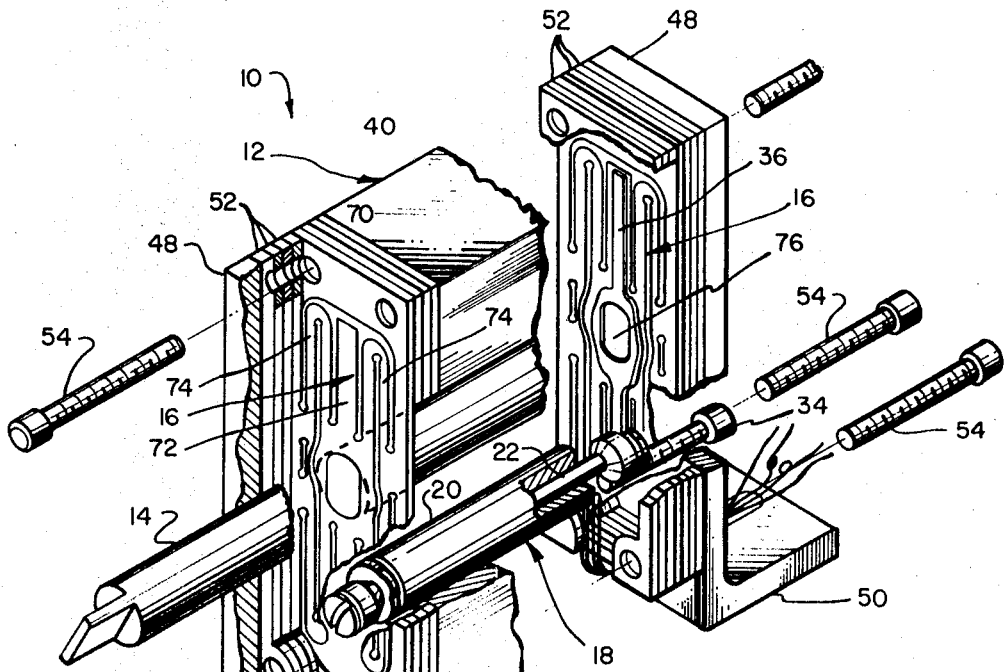
Fig. 1
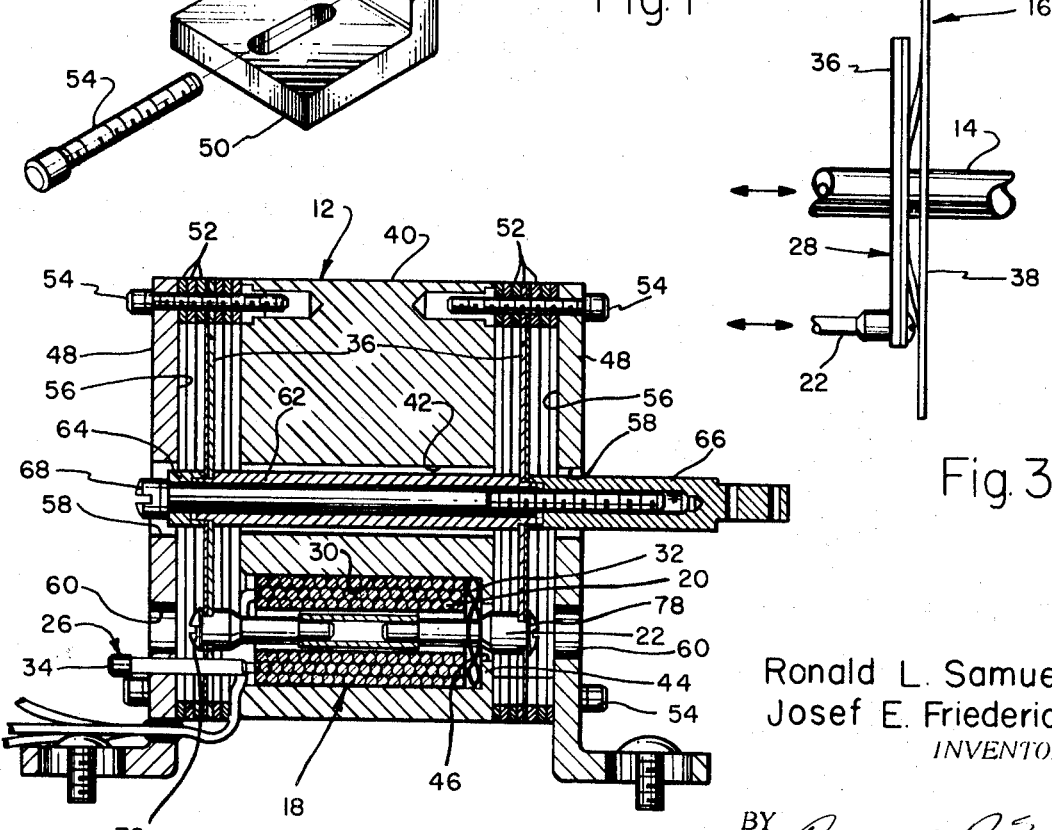
Fig. 2
Fig. 3
Ronald L. Samuels
Josef E. Friederichs
INVENTORS
BY Ronald R. Tyhayn
ATTORNEY

LINEAR VARIABLE ELECTRICAL TRANSDUCER

BACKGROUND OF THE INVENTION

1. Field of the Invention

This invention relates generally to electrical transducers and more particularly to a linear variable electrical transducer characterized by compact size, relatively long stroke, very low breakaway friction, and rugged damage and clog resistant construction. The invention relates also to a novel flexure configuration for the transducer.

2. Prior Art

The prior art is replete with a wide variety of linear electrical transducers. These transducers vary substantially in their detailed construction, but are all characterized generally by a housing containing an axially movable coupling shaft and electrical shaft position-sensing means for producing an electrical position signal representing the position of the shaft relative to the housing. While the existing linear transducers of this type are satisfactory for many applications, they suffer from one disadvantage which this invention overcomes. The disadvantage referred to resides in the fact that the relative removable element of the electrical position-sensing means also serves as the load-bearing coupling shaft of the transducer. The shaft position sensing means of a conventional linear variable differential transducers, for example, is a linear variable differential transformer including a coil surrounding an axially movable magnetic core which extends externally of the housing to form a coupling shaft.

As a consequence of this transducer construction, the movable element of the shaft position-sensing means, and hence the sensing means as a whole, must be sized and structured to withstand the external loads which the coupling shaft may encounter in use. These loads are not only those incident to normal operation of the transducer but also shock loads and other overloads which the shaft may inadvertently experience in use. Because of this load-supporting requirement, the elements, and particularly the coupling-shaft-defining element of the sensing means, must be relatively rugged and hence relatively large in size. Also bushings or similar radial restraints must be provided to react radial loads. A precise sensor thus requires very small clearance in these bushings. These small clearances tend to seize up due to dust and other particles found in normal manufacturing shop use. This invention avoids this by using flexures. These factors result in a transducer having a relatively large overall size and weight. Such transducer size and weight, while perhaps not important in many applications, are critical in other applications to which the existing transducers are thus ill-suited. Another disadvantage of the existing transducers resides in the fact that the spring load forces often needed to counteract breakaway friction and possible dust clogged clearances in conventional designs sometimes introduce a gaging error by reacting on the part being measured. This invention allows use of very small spring load forces and thus is a more accurate gaging instrument.

SUMMARY OF THE INVENTION

The present invention avoids the above disadvantage of the existing linear transducers by effectively separating the transducer coupling shaft and the electrical shaft position-sensing means in such a way that the sensing means are totally isolated from the external loads imposed on the shaft. As a consequence, the elements of the sensing means are required to withstand only those loads incident to the shaft position-sensing function of the sensing means. This feature of the invention, then, permits the use of a miniature shaft positioned sensing means and, thereby, accomplishes a substantial reduction in the overall size and weight of the transducer.

An important feature of the invention resides in a unique flexure configuration for supporting the coupling shaft and the movable element of the shaft position-sensing means for unified movement. This flexure is characterized by a very high aspect ratio as well as a relatively long stroke. The specific advantage of a high aspect ratio design allows the construction of a very thin transducer body. For example, a flexure on the order of 0.5 in width has a total stroke of 0.25 inch without permanently deforming the metal. The present flexure supports provide stiff radial positioning of the coupling shaft and movable sensing element while requiring very low force for shaft movement and virtually eliminating breakaway resistance or friction of the shaft and movable sensing element. Another advantage of the flexure supports is the elimination of small radial bearing clearances which would tend to clog and thereby seize up and/or require the use of an undesirable spring load on the coupling shaft to counteract the resulting high breakaway friction.

Another feature of the invention is concerned with calibration adjustment of the transducer. According to this feature, the relatively stationary element of the shaft positioned sensing means is spring loaded in one direction and is adjustable with and against spring pressure, to effect relative adjustment of the sensing elements independently of the transducer coupling shaft, by operation of an adjusting screw. This method of adjustment presents the advantages of simplicity and backlash elimination.

BRIEF DESCRIPTION OF THE DRAWINGS

In the drawings:

FIG. 1 is a perspective view of the transducer with parts exploded and broken away for the sake of clarity;

FIG. 2 is a longitudinal section to the transducer; and

FIG. 3 is a fragmentary view of certain elements of the transducer.

DESCRIPTION OF THE PREFERRED EMBODIMENT

The transducer 10 of the invention which has been selected for illustration in the drawings has a housing 12 containing a coupling shaft 14. Means 16 support the shaft in the housing for axial movement relative to the housing. Within the housing, at one side of the coupling shaft 14, is an electrical shaft position sensor 18 for sensing the axial position of the shaft relative to the housing and generating an electrical position signal representing this relative shaft position. The shaft position sensor includes a pair of relatively movable sensing elements 20 and 22 having an axis of relative movement parallel to and spaced laterally from the coupling shaft 14. Sensing element 20 is a relatively stationary element. Sensing element 22 is a relatively movable element. Associated with the stationary sensing element 20 are means 26 for mounting the element in fixed position within the housing 12. The movable sensing element 22 is secured by means 28 to the coupling shaft 14 for axial movement with the shaft relative to the stationary sensing element 20.

It will become evident as the description proceeds that a variety of electrical shaft position sensors may be employed in the present transducer. The particular sensor illustrated is a linear variable differential transformer. The stationary sensing element 20 of the sensor or transformer is a coil structure. The movable sensing element 22 is a magnetic core.

The mounting means 26 for the stationary sensing element or transformer coil 20 comprises a bore 30 in the housing 12 which is dimensioned to slidably receive the coil. The length of this bore is greater than the overall length of the coil to permit limited axial adjustment of the coil in the housing. Acting between one end of the coil and the housing is a spring 32 for urging the coil in the direction of its opposite end. This latter end of the coil is engaged by a setscrew 24 threaded in the housing, such that the coil is positioned axially relative to the housing by the conjoint action of the spring and setscrew. The coil may obviously be adjusted axially relative to the housing by adjustment of the setscrew.

The supporting means 28 for the movable sensing element or transformer core 22 comprises a pair of relatively rigid crossbeams 36 fixed to the coupling shaft 14 and to the ends of the core. These crossbeams support the core concentrically within the transformer coil 20 and for movement in unison with the coupling shaft 14 along the transformer axis. In the particular inventive embodiment illustrated, the coupling shaft supporting means 16 comprise a pair of flexures 38 adjacent beams 36. The beams and flexures are preferably bonded to one another in the manner explained below.

As will appear from the ensuing description, the transducer housing 12 and coupling shaft 14 provide the primary load-carrying members of the transducer. The only loads imposed on the shaft position sensor or transformer 18 are those incident to its shaft position-sensing function. As a consequence, the transformer is totally isolated from all external loads applied to the coupling shaft 14. This feature of the invention is beneficial for the reason that it permits the use of a relatively fragile miniature sensor or transformer and thereby accomplishes a substantial reduction in the overall size and weight of the transducer.

Referring now with greater detail to the embodiment of the invention which has been selected for illustration, the transducer housing 12 will be seen to have a laminated construction. Thus, the housing includes a central rectangular block 40 with a bore 42 through which extends the coupling shaft 14. The block also contains the receiving bore 30 for the transformer coil 20. The shaft bore 42 opens through opposite ends of the housing block 40 and has a uniform diameter greater than that of the coupling shaft 14. The coil-receiving bore 30 opens at one end through an end face of the block 40 and is closed at its other end by an end wall 44 which seats the coil spring 32. Extending through this end wall, on the axis of the bore 30, is a smaller bore 46.

At opposite ends of the housing block 40 are a pair of end plates 48. The lower ends of these plates extend below the bottom side of the block and terminate in outwardly directed mounting flanges 50. Flanges 50 are apertured to receive mounting screws for attaching the housing to a support. Between each end of the housing block 40 and the adjacent end plate 48 are a number of relatively thin spacer plates 52. The block, end plates, and spacer plates are joined by screws 54. As may be best observed in FIG. 1, spacer plates 52 have an open rectangular configuration, such that when the block, end plates, and spacer plates are assembled, they define rectangular cavities 56 at the ends of the housing. The end plates 48 have bores 58, 60 on the axes of the block bores 42, 30, respectively.

The transducer coupling shaft 14 extends centrally through the aligned housing shaft bores 42, 58. For reasons which will appear presently, the shaft is composed of a center section 62, a rear cap section 64, and a relatively long front section 66. These shaft sections have telescopically interfitting ends and are joined by a bolt 68 which extends centrally through the sections and is threaded in the front shaft section. The front shaft section 66 extends a distance beyond the adjacent housing end plate 48 for engagement with or connection to an external part (not shown) whose position is to be sensed by the transducer.

The housing cavities 56 contain the shaft crossbeams 36 and flexures 38. Each flexure is constructed of light gage spring brass or other spring metal and has the same outline and dimensions as the housing block 40, and plates 48, 52. The outer margin 70 of each flexure is clamped between adjacent spacer plates. The flexures are located approximately midway between the end walls of their respective housing cavities 56. It will be observed that each flexure has slits which provide the flexure with its outer rectangular margin 70, an elongate center section 72 along the longitudinal centerline of the flexure, and a pair of long narrow loop formations 74 between the center section and the longitudinal portions of the margin 70. The outer longitudinal portions of these loop formations are joined at their centers to the adjacent longitudinal margin portions. The inner longitudinal portions of the loop formations are joined at their centers to the center flexure section 72.

The coupling shaft beams 36 seat against the inner surfaces of the center flexure sections 72. Preferably, the beams are adhesively bonded, brazed, or otherwise secured to their respective center flexure sections. Extending through the center flexure sections 72 and the beams 36 are central openings 76 which snugly receive the reduced ends of the center coupling shaft section 62. The flexures and beams are firmly clamped between the center shaft section and the two outer shaft sections 64, 66. The openings 76 and reduced ends of the center shaft section 62 have complimentary noncircular shapes. Accordingly, the coupling shaft 14, beams 36 and flexures 38 are positively keyed against relatively rotation about the axis of the shaft. The lower ends of the beams 36 and the center flexure sections 72 straddle the transformer core 22 in its endwise direction and are secured to the core by screws 78.

It will now be understood that the flexures 38 support the coupling shaft 14 and sensor core 22 for relatively frictionless axial movement with virtually no breakaway resistance or friction. The unique configuration of the flexures provides a transducer of high aspect ration, as shown, as well as relatively long stroke without permanent deformation of the flexures. Travel of the shaft is positively limited by abutment of the beams 36 and center flexure sections 72 with the end walls of their respective housing cavities 56. The beams rigidly join the coupling shaft 14 and the transformer core 22 for axial movement of the core with the shaft relative to the transformer coil 20. Accordingly, transformer 18 generates an electrical position signal representing the axial position of the coupling shaft relative to the transducer housing 12. Calibration adjustment of the transducer is accomplished by rotation of the setscrew 34 to adjust the axial position of the transformer coil 20 relative to the core 22 independently of the coupling shaft.

An important feature of the invention resides in the fact that all of the external loads applied to the transducer are carried by the transducer housing 12 and the coupling shaft 14. The only loads imposed on the shaft position sensor 18 are those incident to its shaft position-sensing function. The feature, then, permits the use of a relatively fragile miniature linear variable differential transformer or other shaft position sensor and thereby accomplishes a substantial reduction in the overall size and weight of the transducer. In this regard, it is significant to recall that axial travel of the coupling shaft is limited by contact of the shaft crossbeams 36 and the beam reinforced center flexure sections 72 with the end walls of the housing cavities 56. Accordingly, no travel limiting loads are applied to the sensor or to the shaft flexures 38. Further, the coupling shaft is preferably dimensioned to have a relatively close fit in the housing end plate bores 58, such that lateral overloads on the shaft are transmitted directly to the housing rather than through the flexures. The radial clearances between the shaft and walls of the end plate bores has been exaggerated for clarity. However, these radial clearances are not made so small as to render them prone to clogging by dust and other particles present in most manufacturing shops. Clogging of these clearances, of course, would cause them to seize up and thereby resist movement of the coupling shaft.

We claim:
1. A linear electrical transducer comprising:
a housing;
a coupling shaft extending through and having an end accessible externally of said housing;
means supporting said shaft for axial movement relative to said housing; and
a shaft position sensor within said housing at one side of said shaft including a pair of relatively movable sensing elements having an axis of relative movement parallel to and spaced laterally from said shaft, means for generating a position signal representing the relative positions of said elements along said axis, said sensing elements including a relatively stationary element and a relatively movable element having opposite ends, means mounting said stationary sensing element within said housing, and relatively rigid crossbeams extending between and fixed to said shaft and the ends of said movable element securing said movable sensing element to said shaft for axial movement with said shaft relative to said stationary element.

2. A transducer according to claim 1, wherein:

said shaft-supporting means comprise flexures having outer marginal portions secured to said housing and movable inner sections secured to said shaft and seating against said beams, respectively.

3. A transducer according to claim 2, including:

means securing said beams to said center flexure section.

4. A linear electrical transducer comprising:

a housing including a central block having opposite ends;

a pair of spaced parallel bores extending through said block normal to said ends;

end plates opposite said ends, respectively, of said block, spacer plates between said end plates and said block, and means joining said block and plates in assembled relation;

said spacer plates having similar open rectangular configurations and defining with said block and end plate cavities at the ends of said housing;

a coupling shaft extending centrally through one of said bores;

one end of said shaft projecting into one of said housing cavities and the opposite end of said shaft extending through the other housing cavity and the adjacent end plate to the exterior of said housing;

a linear electrical shaft position sensor within the other bore including a relatively stationary sensing element fixed to said housing and a relatively movable sensing element movable relative to said stationary element along the axis of the latter bore;

the ends of said movable sensing element projecting into said housing cavities; and connecting means joining the ends of said movable sensing element and said coupling shaft for axial movement of said movable element with said shaft relative to said stationary sensing element.

5. A transducer according to claim 4, wherein:

said shaft position sensor comprises a linear variable differential transformer including a coil which provides said stationary sensing element and a magnetic core which provides said movable sensing element.

6. A transducer according to claim 4, including:

flexures within said housing cavities having outer marginal portions clamped between adjacent spacer plates and center flexible sections secured to said coupling shaft to support said shaft for axial movement within said first mentioned bore.

7. A transducer according to claim 6, wherein:

said connecting means comprise rigid crossbeams fixed to said shaft and movable element in seating contact with said center flexure sections, respectively.

8. A transducer acccording to claim 7, including:

means joining said crossbeams and center flexure sections.

9. A transducer according to claim 8, including:

a spring within said second mentioned bore for urging said stationary sensing element in one direction along said axis, and an externally accessible adjusting screw threaded in said housing and engageable with said stationary element for adjusting said stationary element relative to said core independently of said coupling shaft.

10. A transducer comprising:

a housing;

a shaft movable axially within said housing;

a shaft position sensor within said housing at one side of said shaft including a pair of relatively movable sensing elements having an axis of relative movement parallel to and spaced laterally from said shaft, means for generating a position signal representing the relative positions of said elements along said axis, said sensing elements including a relatively stationary element and a relatively movable element having opposite ends; and a pair of flexures secured to said housing, said shaft, and the ends of said movable element, said flexures supporting and interconnecting said shaft and movable element for axial movement in unison, whereby said sensor produces a signal representing the axial position of said shaft.

11. A transducer according to claim 10 wherein:

said flexures have outer marginal portions secured to said housing and inner movable sections secured to said shaft and movable element, and means reinforcing said inner sections against flexing.

12. A transducer according to claim 10 wherein:

said housing has an opening containing and slightly larger in diameter than said shaft;

said sensor comprises a linear variable differential transducer and said stationary and movable sensing elements comprise the coil and core of said latter transducer, said coil having an opening containing and of slightly larger diameter than said core; and said flexures support said shaft and core concentrically within and in spaced relation to the walls of their respective openings.

13. A transducer comprising:

a housing;

a shaft movable axially within said housing;

means supporting said shaft for axial movement relative to said housing; and a shaft position sensor within said housing at one side of said shaft including a pair of relatively movable sensing elements having an axis of relative movement parallel to and spaced laterally from said shaft, means for generating a position signal representing the relative positions of said elements along said axis, said sensing elements including a relatively stationary element and a relatively movable element having opposite ends, and relatively crossbeams extending between and joining the ends of said movable sensing element and shaft for axial movement of said movable element with said shaft relative to said stationary element.